United States Patent
Funada (10) Patent No.: US 6,961,451 B2
(45) Date of Patent: Nov. 1, 2005

(54) FINGERPRINT/PALMPRINT IMAGE PROCESSOR AND PROCESSING METHOD

(75) Inventor: Junichi Funada, Tokyo (JP)

(73) Assignee: NEC Corporation, Tokyo (JP)

( * ) Notice: Subject to any disclaimer, the term of this patent is extended or adjusted under 35 U.S.C. 154(b) by 684 days.

(21) Appl. No.: 10/103,856

(22) Filed: Mar. 25, 2002

(65) Prior Publication Data

US 2002/0164055 A1 Nov. 7, 2002

(30) Foreign Application Priority Data

Mar. 26, 2001 (JP) .......................................... 2001-087711

(51) Int. Cl.$^7$ .................................................. G06K 9/00
(52) U.S. Cl. ......................... 382/124; 382/254; 356/71; 340/5.83; 902/3
(58) Field of Search ................................ 382/115–127; 356/71; 340/5.52, 5.53, 5.8–5.83; 902/3, 5

(56) References Cited

U.S. PATENT DOCUMENTS

| | | | |
|---|---|---|---|
| 5,177,353 A | * | 1/1993 | Schiller ................. 250/227.11 |
| 5,426,708 A | | 6/1995 | Hamada et al. |
| 5,937,082 A | | 8/1999 | Funada |
| 6,118,891 A | | 9/2000 | Funada |
| 2001/0036300 A1 | * | 11/2001 | Xia et al. ................... 382/125 |

FOREIGN PATENT DOCUMENTS

| | | |
|---|---|---|
| EP | 0 646 886 A2 | 4/1995 |
| EP | 0 685 815 A1 | 12/1995 |
| EP | 0 780 780 A2 | 6/1997 |
| JP | 9-167230 | 6/1997 |
| JP | 2765335 | 3/1998 |

OTHER PUBLICATIONS

Funada et al., "Feature Extraction Method for Palmprint Considering Elimination of Creases," Pattern Recognition, Aug. 1998, Proceedings 14th International Conference, Los Alamitos, CA.

D. Vernon, "Automatic Detection of Secondary Creases in Fingerprints," Oct. 1993 Optical Engineering, Soc. Of Photo-Optical Instrumentation Engineers, vol. 32, No. 10, pp. 2616–2623.

* cited by examiner

Primary Examiner—Jon Chang
Assistant Examiner—Charles Kim
(74) Attorney, Agent, or Firm—Foley & Lardner LLP

(57) ABSTRACT

The region feature judging part judges whether local regions are regions including ridges only or regions including a mixture of creases and ridges, and the suitable ridge image selecting part selects images showing ridges among ridge candidate images based on evaluation criteria adapted to each of the crease and ridge mixed regions and ridge exclusive regions.

33 Claims, 8 Drawing Sheets

CORE

FIG. 4B(PRIOR ART)

DELTA

FINGERPRINT/PALMPRINT IMAGE PROCESSOR AND PROCESSING METHOD

BACKGROUND OF THE INVENTION

1. Technical Field of the Invention

The present invention relates to a fingerprint/palmprint image processor, processing method, and processing program to be used for fingerprint identification, fingerprint classification, and palmprint identification.

2. Description of the Related Art

Conventionally, as a method for automatically extracting ridge information including ridge directions and ridge pitches from a fingerprint image, for example, a ridge direction pattern smoothing method and device are disclosed in Japanese Patent Publication No. 2765335, and a fingerprint pattern classification by means of a relaxation method was proposed by Kawagoe et al. in the 22nd Information Processing Society of Japan (first term of 1981). The ridge direction pattern smoothing method and device are based on the energy minimizing principle, wherein evaluation functions are set for directions extracted from each two-dimensional local region set on an image by taking the degree of reliability as a measure, and the evaluation functions are minimized for smoothing. On the other hand, in fingerprint pattern classification by means of the relaxation method, information on directions extracted from each two-dimensional local region set on an image is smoothed by means of the relaxation method.

However, in the method disclosed in Japanese Patent Publication No. 2765335, when smoothing an image including creases, surrounding regions may also be smoothed in accordance with creases, resulting in emphasized creases. In the art described in fingerprint pattern classification by means of the relaxation method, the relaxation method is used as a method for smoothing information on directions extracted from each local region, however, in this method, smoothing may be applied to many creases that exist across a wide range of the fingerprint in parallel to each other at similar pitches in accordance with the creases, so that the creases may be emphasized.

Therefore, the inventor of the present invention proposed a fingerprint/palmprint image processor which can extract a ridge image from a fingerprint/palmprint image without influences from creases in Japanese Unexamined Patent Publication No. Hei-9-167230. In the processor disclosed in this publication, an inputted fingerprint/palmprint image is divided into a plurality of blocks, and a plurality of ridge candidates are detected from each block, and among the detected ridge candidates, ridge candidates that can be securely judged as ridges and the blocks including the ridge candidates are determined, and candidates in other blocks matching with the determined ridge candidates are selected. The ridge patterns are spatially continued with each other and the crease patterns are spatially continued with each other, however, generally, creases and ridges are not continued with each other, so that candidates that can be securely judged as ridges are detected, and candidates matching with the detected candidates are selected among other local candidates, whereby it becomes possible to accurately detect ridges even in regions with creases.

Figure 1:
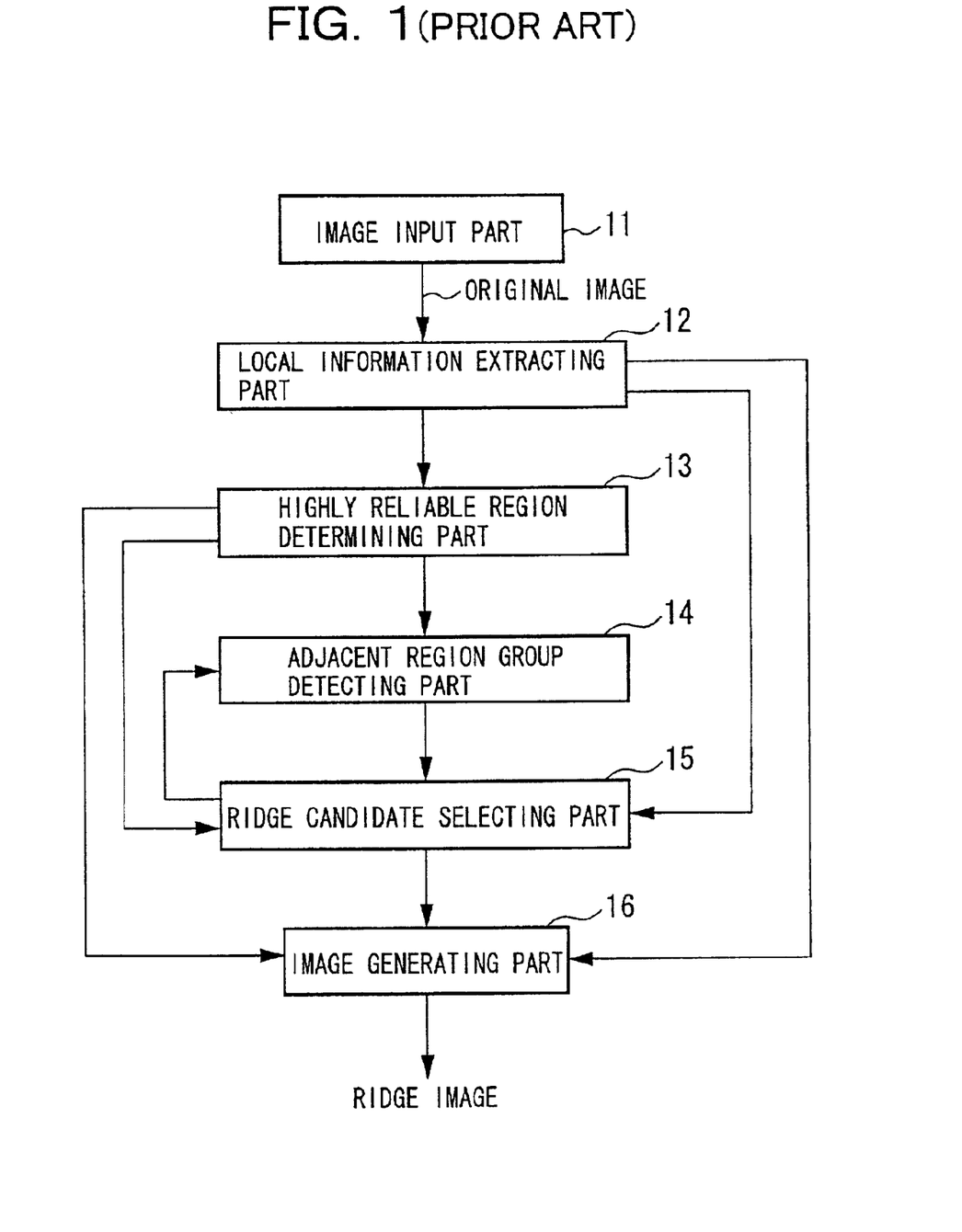
FIG. 1 is a block diagram showing a conventional fingerprint/palmprint image processor.

FIG. 1 shows the relationship between the parts of the abovementioned fingerprint/palmprint image processor. FIG. 1 corresponds to FIG. 9 of Japanese Unexamined Patent Publication No. Hei-9-167230. However, for easy explanation, FIG. 1 is a simplified drawing of FIG. 9 of the same publication. In FIG. 1, reference numeral 11 denotes an image input part, reference numeral 12 denotes a local information extracting part, reference numeral 13 denotes a highly reliable region determining part, reference numeral 14 denotes an adjacent region group detecting part, reference numeral 15 denotes a ridge candidate selecting part, and reference numeral 16 denotes an image generating part. Herein, the highly reliable region determining part 13 corresponds to the first ridge candidate image selecting part 12, continuity evaluating part 13, clustering part 14, and cluster evaluating part 15 of the same publication. The adjacent region group detecting part 14 and ridge candidate selecting part 15 correspond to the optimum ridge candidate image selecting part 17.

Figure 2:
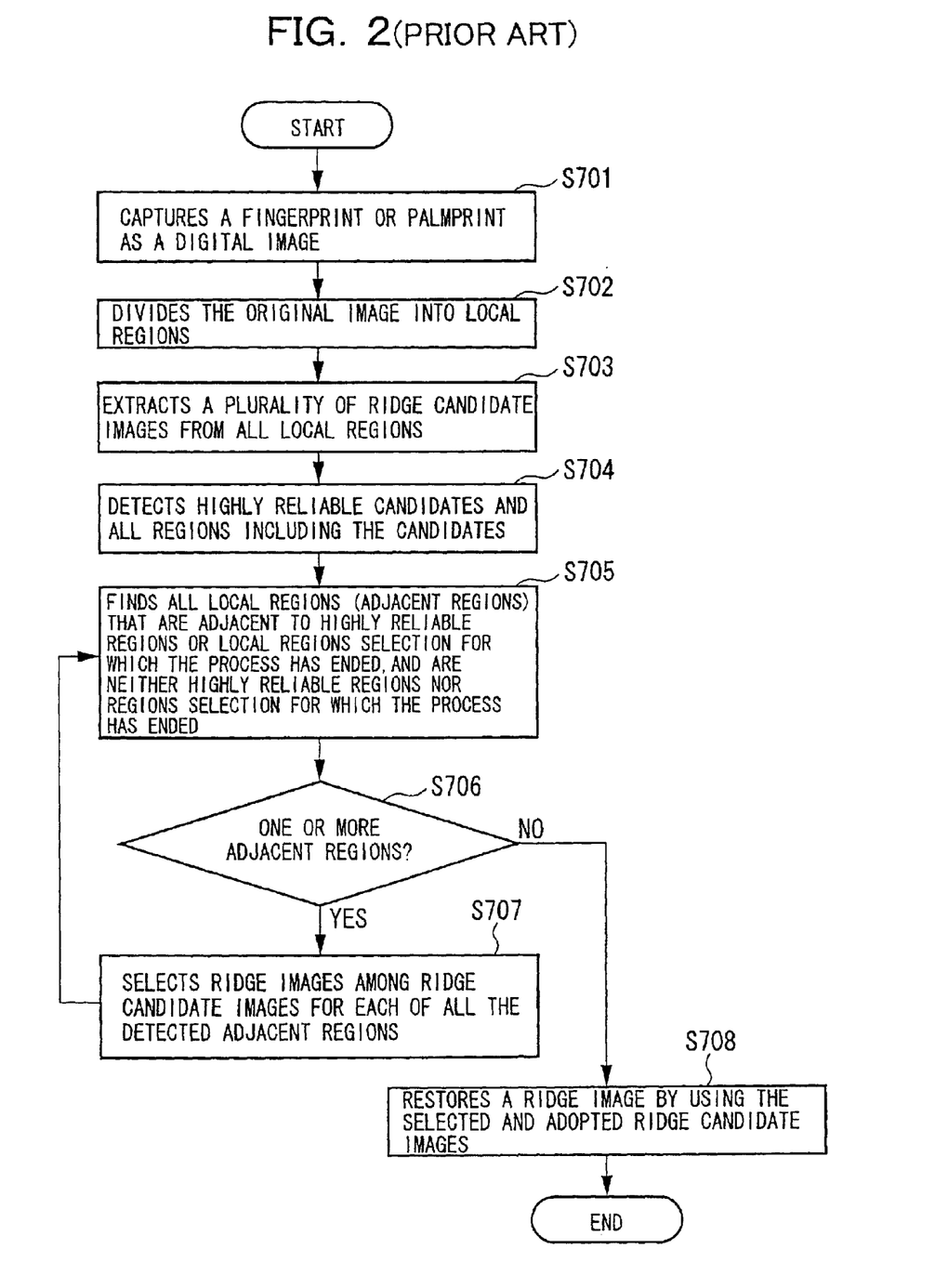
FIG. 2 is a flowchart showing the operation of the conventional processor of FIG. 1.

FIG. 2 is a flowchart showing the operation of the processor of FIG. 1. In FIG. 2, the image input part 11 reads-in a fingerprint/palmprint as an image, and supplies it to the local information extracting part 12 in the form of a digital image (S701). The local information extracting part 12 divides the inputted original image into two-dimensional local regions (S702), and extracts a plurality of images that are candidates rendering ridges existing in each local region (hereinafter, referred to as ridge candidate images) (S703). Numeral numbers are attached to each extracted ridge candidate image. The extracted ridge candidate images are supplied to the highly reliable region determining part 13, ridge candidate selecting part 14, and image generating part 16, respectively. In the highly reliable region determining part 13, ridge candidates that are highly likely to be defined as ridges among a plurality of ridge candidate images and local regions including the ridges (highly reliable regions) are determined (S704), and the ridge candidates and local regions are supplied to the adjacent region group detecting part 14, ridge candidate selecting part 15, and image generating part 16, respectively.

Figure 3A:
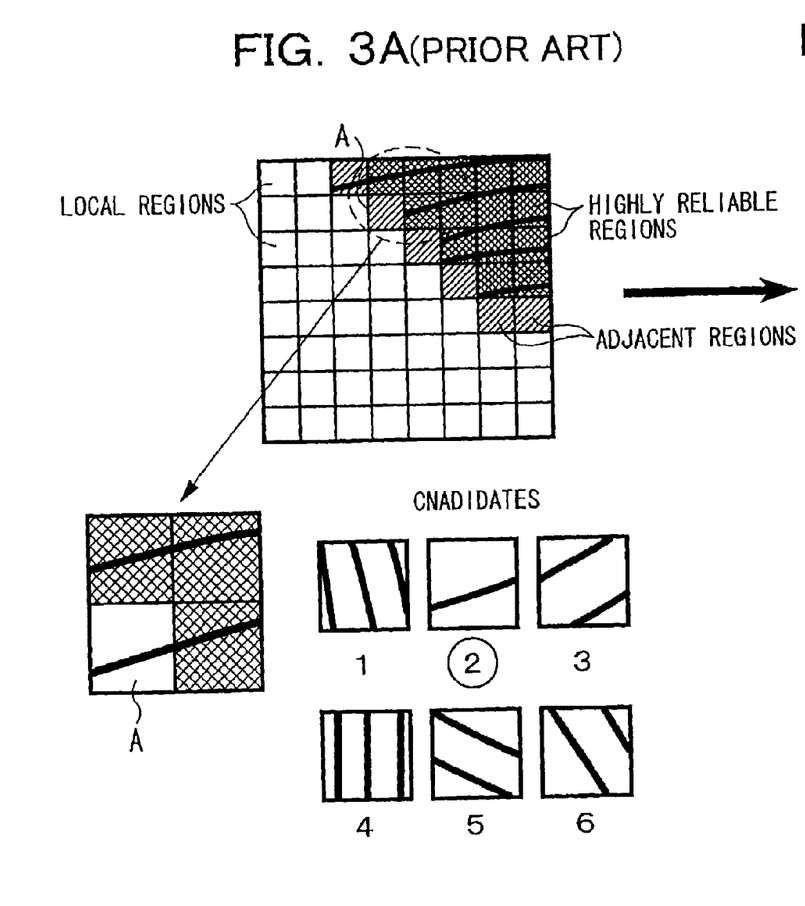
FIGS. 3A and 3B are drawings for explaining processing for selecting ridge images of FIG. 2.

The adjacent region group detecting part 14 finds all local regions (adjacent regions) adjacent to the highly reliable regions (S705). For example, as shown in FIG. 3A, when the highly reliable regions (shown by dark hatching) are found, the regions (shown by light hatching) adjacent to the highly reliable regions are detected as adjacent regions. Next, it is judged whether or not the number of adjacent regions is one or more (S706). For example, in the example of FIG. 3A, since the number of adjacent regions is more than one, the process progresses to S707, and ridge images are selected among ridge candidate images for each of all the adjacent regions detected by the ridge candidate selecting part 15, and the image generating part 16 is notified of the selected candidate numbers.

Figure 3B:
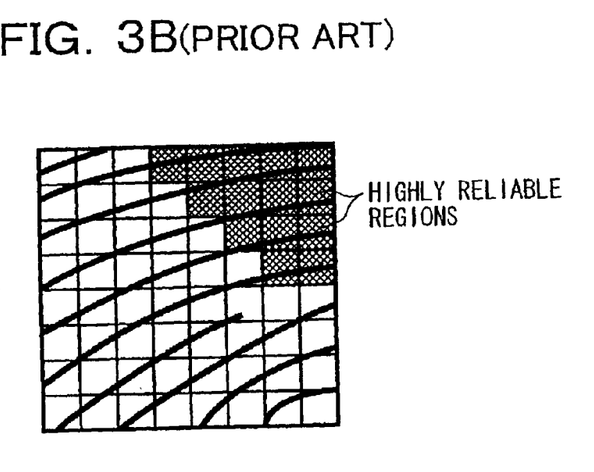

For example, when candidate selection processing is carried out for the adjacent region A of FIG. 3A, a candidate having high continuity is selected among ridge candidate images 1 through 6, and in this case, the candidate image 2 is selected. Next, the process returns to S705, and with respect to a highly reliable region or a local region selection for which the process has ended, all adjacent regions that are neither highly reliable regions nor regions selection for which the process has ended are detected. That is, in the case of FIG. 3A, all regions adjacent to lower sides to the previously found adjacent regions are found. Next, it is judged whether or not the number of adjacent regions is one or more in S706, and when the number is one or more, ridge images are selected from the ridge candidate images of all adjacent regions in S707. Then, processing from S705 to S707 is repeated. When "NO" is judged in S706, processing has ended for all local regions, so that the image generating part 16 creates a whole ridge image by using the selected candidate images as shown in FIG. 3B (S708).

Figure 4A:
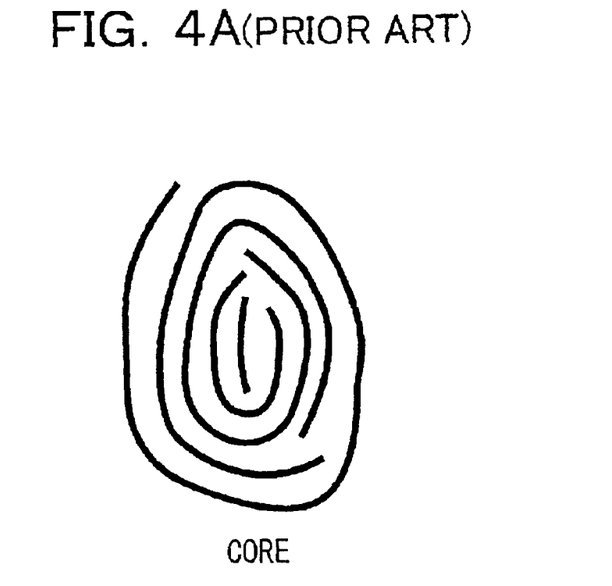
FIGS. 4A and 4B are drawings showing examples of portions such as core and delta portions including ridges with great curvatures.
Figure 4B:
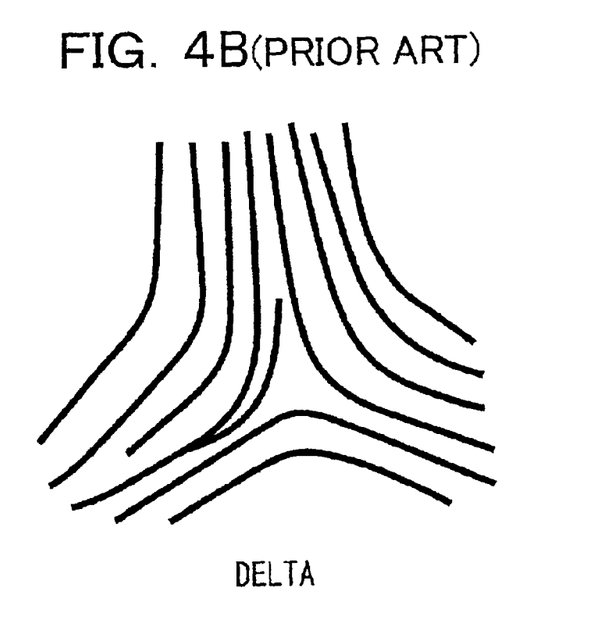

In the fingerprint/palmprint image processor disclosed in Japanese Unexamined Patent Publication No. Hei-9-167230 of 1997 mentioned above, it is possible to extract ridges without influence from creases, however, since ridge images are determined for each local region by taking the continuity with adjacent regions as important, at a portion including ridges with great curvatures such as the core shown in FIG. 4A or the delta shown in FIG. 4B, image candidates including creases with good continuity may be selected rather than images including ridges even when the ridges are clear, resulting in a failure of ridge extraction.

SUMMARY OF THE INVENTION

The object of the present invention is to provide a fingerprint/palmprint processor and processing method, and a program therefor in which ridges can be accurately extracted even from regions including a mixture of creases and portions including ridges with high curvatures.

In order to achieve the abovementioned object, a fingerprint/palmprint image processor according to the present invention comprises a reading-in part for reading-in a fingerprint or palmprint as an image; an extracting part for dividing the fingerprint/palmprint image into local regions and extracting ridge candidate images showing ridges from each local region; a determining part for determining candidate images that are highly likely to be judged as ridges among the extracted ridge candidate images and local regions including the determined candidate images as highly reliable regions; a judging part for judging whether local regions other than the highly reliable regions are ridge exclusive regions or crease and ridge mixed regions with a mixture of creases and ridges; a selecting part for selecting candidate images that are supposed to show ridges among the ridge candidate images based on evaluation criteria provided for each ridge exclusive region and crease and ridge mixed region; and a generating part for generating a whole image based on the candidate images of the highly reliable region determining part and the candidate images selected by the selecting part.

A fingerprint/palmprint image processing method according to the invention comprises the steps of reading-in a fingerprint or palmprint as an image; dividing the fingerprint/palmprint image into local regions and extracting ridge candidate images showing ridges from each local region, determining candidate images that are highly likely to be ridges among the extracted ridge candidate images and local regions including the determined candidate images as highly reliable regions; judging whether local regions other than the highly reliable regions are ridge exclusive regions including the existence of ridges only or crease and ridge mixed regions including a mixture of creases and ridges; selecting candidate images that are supposed to show ridges among ridge candidate images based on evaluation criteria provided for each of the ridge exclusive regions and crease and ridge mixed regions; and generating a whole image based on the candidate images of the highly reliable region determining step and the candidate images selected in the selecting step.

Furthermore, a program according to the invention causes a computer to carry out processes for dividing a fingerprint/palmprint image into local regions and extracting ridge candidate images showing ridges from each local region; determining candidate images that are highly likely to be ridges among the extracted ridge candidate images and local regions including the determined candidate images as highly reliable regions; judging whether local regions other than the highly reliable regions are ridge exclusive regions including the existence of ridges only or crease and ridge mixed regions including a mixture of creases and ridges; selecting candidate images that are supposed to show ridges among the ridge candidate images based on evaluation criteria provided for each of the ridge exclusive regions and crease and ridge mixed regions; and generating a whole image based on the candidate images of the highly reliable region determining process and the candidate images selected in the selecting process.

THE PREFERRED EMBODIMENTS OF THE INVENTION

Figure 5:
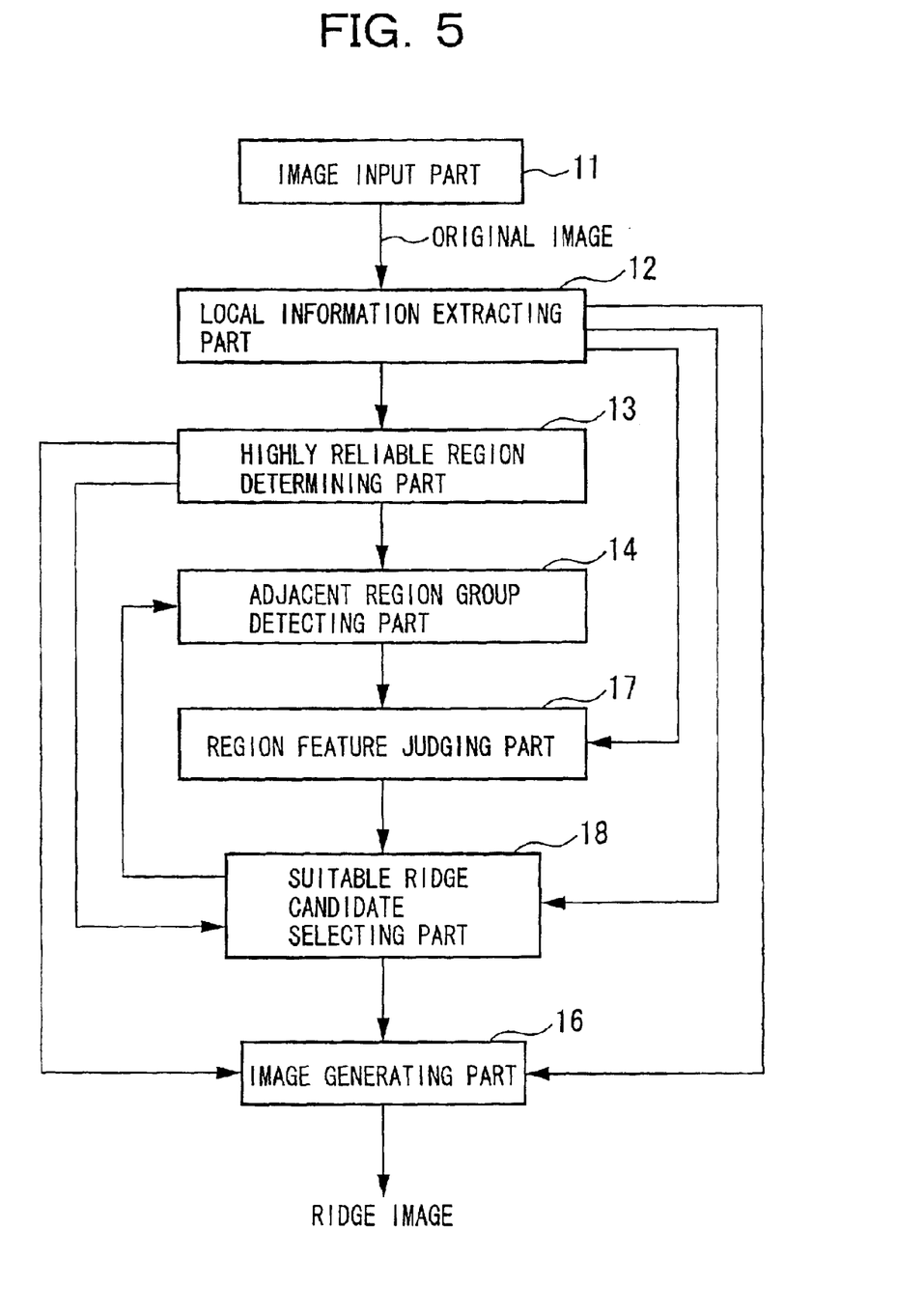
FIG. 5 is a drawing showing the construction of a fingerprint/palmprint image processor according to an embodiment of the invention.

The preferred embodiments of the present invention are explained below with reference to the accompanying drawings. FIG. 5 is a drawing showing the construction of a fingerprint/palmprint image processor relating to an embodiment of the invention. In FIG. 5, the same symbols are attached to the same components as in the conventional processor of FIG. 1. In FIG. 5, the image input part 11 for a scanner or live scanner reads-in a fingerprint or palmprint as an image and inputs the fingerprint/palmprint image. The local information extracting part 12 divides the fingerprint/palmprint original image inputted from the image input part into two-dimensional local regions, and extracts a plurality of ridge candidate images showing ridges existing in each local region from each local region. For example, as disclosed in Japanese Unexamined Patent Publication No. Hei-9-167230, the local information extracting part 12 applies two-dimensional Fourier transform to each two-dimensional local region, extracts a plurality of peaks corresponding to different two-dimensional sine waves among peaks at the Fourier transforming plane in order from peaks with greater amplitudes or energy in the proximity of the peaks, and regards the two dimensional sine waves corresponding to the peaks as ridge candidate images.

The highly reliable region determining part 13 determines ridge candidate images that are highly likely to be ridges among the plurality of ridge candidate images of each local region, which have been extracted by the local information extracting part 12, and determines local regions including such candidate images as highly reliable regions. As mentioned in the abovementioned publication, the highly reliable region determining part 13 evaluates the ridge candidate images in each two-dimensional region regarding the degrees of likelihood of being ridges, and selects ridge candidate images having the highest degree of likelihood of being ridges of each local region. In this case, the highly reliable region determining part 13 selects ridge candidate images with the greatest amplitudes among the ridge candidate images of each local region.

The adjacent region group detecting part 14 detects all blocks (local regions) that are neither highly reliable regions determined by the highly reliable region determining part 13 nor local regions in which ridge candidate images have been selected among local regions adjacent to the local regions in which ridge candidate images have been selected. Hereinafter, thus detected blocks are referred to as adjacent regions. The region feature judging part 17 judges all adjacent regions as to whether or not the regions are blocks including a mixture of crease and ridge images based on local information from the local information extracting part 12.

Concretely, judgements as to whether or not the regions are blocks including a mixture of creases and ridges are made so that if a value resulting by dividing the amplitude of a ridge candidate image with the greatest amplitude or energy around a corresponding point at the Fourier plane by the amplitude of a candidate with the second greatest amplitude or energy around a corresponding point at the Fourier plane is smaller than a predetermined threshold, the block is judged as a crease and ridge mixed block, and if the value is larger, the block is judged not to be a crease and ridge mixed block. The suitable ridge candidate selecting part 18 selects ridge candidates based on evaluation criteria that are different for each local region in accordance with the results of judgement by the region feature judging part 17. The processor 5 of FIG. 5 temporarily stores data at the middle stage of processing into a storage device (not shown) such as a memory as necessary, and reads-out the data as necessary for data processing.

Figure 6:
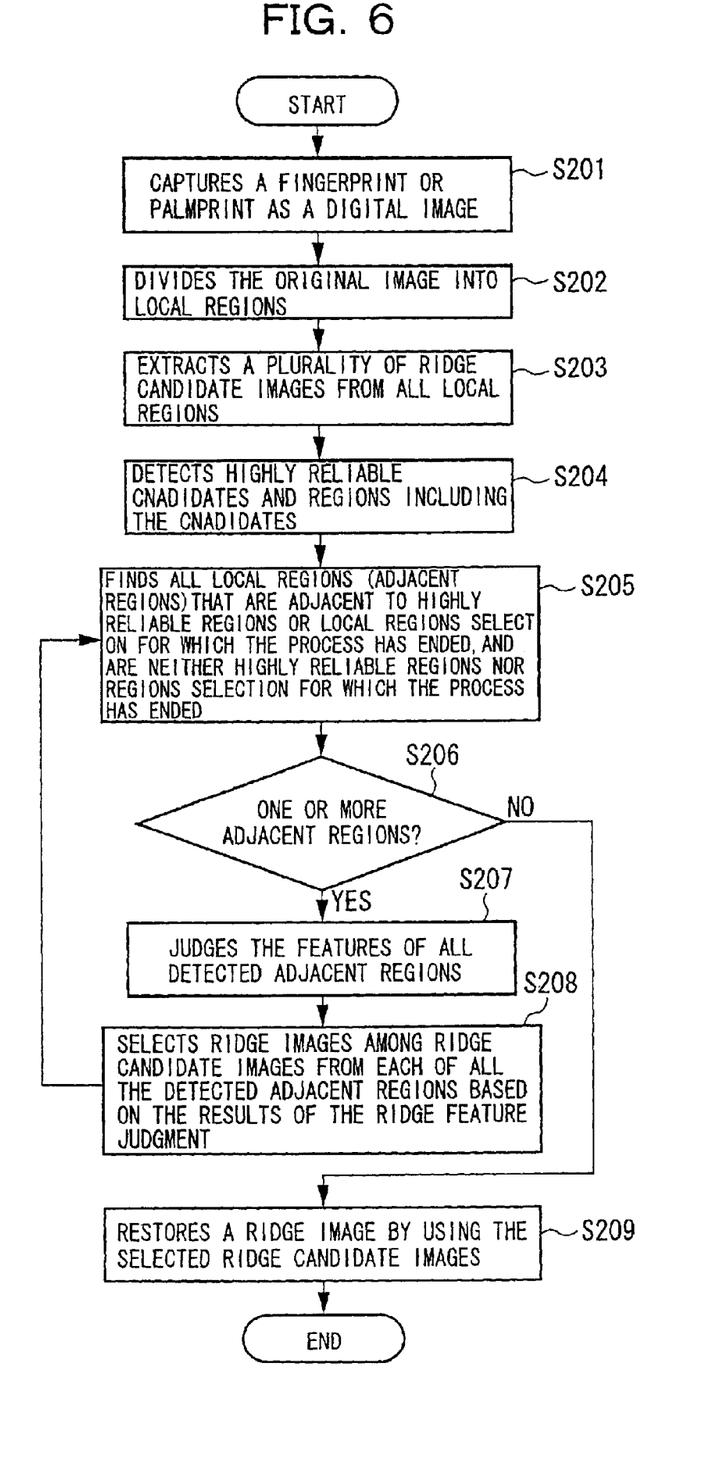
FIG. 6 is a flowchart showing the operation of the embodiment shown in FIG. 5.

Next, concrete operation of the present embodiment is explained in detail with reference to the flowchart of FIG. 6. In FIG. 6, first, the image input part 11 reads-in a fingerprint or palmprint as a digital image, and supplies the fingerprint/palmprint original image to the local information extracting part 12 (S201). The local information extracting part 12 divides the above-mentioned inputted original image into two-dimensional local regions (S202), and extracts a plurality of ridge candidate images showing ridges existing in each two-dimensional local region from each two-dimensional local region (S203). The extracted ridge candidate images are supplied to the highly reliable region determining part 13, region feature judging part 17, suitable ridge candidate image selecting part 18, and image generating part 16.

Herein, when the resolution for input images of the image inputting part 11 is set to 20 pixel/mm and local regions are set to be square (see FIG. 7), the length of one side of the local region becomes approximately 8 through 32 pixels. When extracting ridge candidate images, as mentioned in Japanese Unexamined Patent Publication No. Hei-9-167230, a plurality of image power spectrum extreme points of local regions in order from higher points are detected, and two-dimensional sine waves corresponding to the extreme points are regarded as ridge candidate images of each local region. For example, six ridge candidate images are extracted from each local region. Next, parameters characterizing sine waves corresponding to the extreme points thereof are calculated based on the extreme points of each candidate image and recorded.

An example of such parameters is explained. This is disclosed in the abovementioned Japanese Unexamined Patent Publication No. Hei-9-167230. First, when the coordinate values of the n-th peak of a local region Iij (0<i<63, 0<j<63) at the Fourier plane are set to ($\xi n(i,j)$, $\eta$ $n(i,j)$), the local information extracting part 12 calculates the amplitude, phase, direction, frequency, and power around the peak.

The amplitude is calculated by formula (1), the phase is calculated by formula (2), the direction is calculated by formula (3), the frequency is calculated by formula (4), and the power around the peak is calculated by formula (5).

$$a_n^{(i,j)} = 2\sqrt{|F(\xi_n^{(i,j)}, \eta_n^{(i,j)})|^2} \quad i = 1, 2, \ldots 6 \tag{1}$$

$$ph_n^{(i,j)} = \tan^{-1}\left[\frac{\text{Im}\{F(\xi_n^{(i,j)}, \eta_n^{(i,j)})\}}{\text{Re}\{F(\xi_n^{(i,j)}, \eta_n^{(i,j)})\}}\right] \quad i = 1, 2, \ldots 6 \tag{2}$$

$$d_n^{(i,j)} = \tan^{-1}\left[\frac{\eta_n^{(i,j)}}{\xi_n^{(i,j)}}\right] \quad i = 1, 2, \ldots 6 \tag{3}$$

$$f_n^{(i,j)} = \frac{1}{64}\sqrt{(\xi_n^{(i,j)})^2 + (\eta_n^{(i,j)})^2} \quad i = 1, 2, \ldots 6 \tag{4}$$

$$va_n^{(i,j)} = \frac{4\pi^2 \sigma^4}{64^2} \sum_{(\xi,\eta) \in \{(\xi_n^{(i,j)}, \eta_n^{(i,j)}) \text{ close to } 8\}} 2|F(\xi, \mu)|^2 \tag{5}$$

Furthermore, the whole power of f is calculated by formula (6).

$$vt^{(i,j)} = \frac{4\pi^2 \sigma^4}{64^2} \sum_{\xi=-32}^{31} \sum_{\eta=-32}^{31} |F(\xi, \eta)|^2 \tag{6}$$

An image determined by these parameters is expressed as follows:

$$gn(i,j)(x,y) = an(i,j)\cos[2\pi fn(i,j)(x\cos(dn(i,j)) + y\sin(dn(i,j))) - phn(i,j)] \tag{7}$$

Formula (8) expresses candidate images showing ridges in each local region.

$$\{g_n^{(i,j)}(x,y)\}_{n=i}^{6} \tag{8}$$

The local information extracting part 12 calculates these parameters (Formula (9)) for each of all local regions.

$$\{\{a_n^{(i,j)}, ph_n^{(i,j)}, d_n^{(i,j)}, f_n^{(i,j)}, va_n^{(i,j)}\}_{n=i}^{6}, t^{(i,j)}\}_{i=0 j=0}^{63\ 63} \tag{9}$$

As mentioned in Japanese Unexamined Patent Publication No. Hei-9-167230, the highly reliable region determining part 13 determines ridge candidate images (highly reliable candidates) that are highly likely to be ridges and local regions including the determined ridge candidate images as highly reliable regions (S204). The determined highly reliable candidates and highly reliable regions including the highly reliable candidates are supplied to the adjacent region group detecting part 14, suitable ridge candidate selecting part 18, and image generating part 16. Herein, the highly reliable region determining part 13 evaluates all ridge candidate images regarding the degrees of likelihood of being ridges for each of all local regions, and selects one ridge candidate image having a high degree of likelihood of being a ridge from each local region, and regards the selected images as highly reliable candidate images.

As algorithm in this case, as mentioned in the abovementioned publication, two-dimensional Fourier transform is applied to each two-dimensional local region by the local information extracting part 12, and among obtained peaks at the Fourier transforming plane, a plurality of peaks corresponding to different two-dimensional sine waves are extracted in order from peaks with greater amplitudes or energy around the peaks, and two-dimensional sine waves corresponding to each peak are regarded as ridge candidate images, and furthermore, a ridge candidate image with the greatest amplitude among the ridge candidate images of each two-dimensional local region is regarded as a highly reliable candidate image. The adjacent region group detecting part 14 finds all local regions (adjacent regions) adjacent to the highly reliable regions (S205). For example, as shown in FIG. 3A, when highly reliable regions (shown by dark hatching) are detected, regions (shown by light hatching) adjacent to the highly reliable regions are detected as adjacent regions.

Next, the adjacent region group detecting part 14 judges whether or not the number of adjacent regions thus detected is one or more (S206). In the example of FIG. 3A, the number of adjacent regions is more than one, so that the process progresses to S207. Furthermore, when the number of adjacent regions is one or more, the region feature judging part 15 is notified of information on the adjacent regions, and otherwise, the image generating part 16 is notified of the information. In S207, the region feature judging part 15 judges whether or not the respective adjacent regions of the adjacent region group are regions including a mixture of creases and ridges based on the local region information from the local information extracting part 12, and notifies the suitable ridge candidate selecting part 18 of the results of judgement. Concretely, among extreme points on the image power spectrum of the adjacent regions, by using a power spectrum ratio of two points satisfying predetermined conditions, a judgement is made as to whether or not the adjacent regions are regions including a mixture of creases and ridges.

The predetermined conditions are that the maximum values exist in half of the frequency space since the real number values of the image power spectrum are symmetric based on the origin, and exist in a spatial frequency band that is likely to involve creases and ridges (concretely, a spatial frequency with approximately 0.25 mm through 1 mm as one cycle). The maximum values at the two maximum extreme points among extreme points satisfying such conditions are used for judgement. That is, when the highest maximum value is p1 and the second highest maximum value is p2, if the value of p2/p1 is more than a predetermined threshold, the region is judged as a crease and ridge mixed region, and otherwise, the region is judged as a region including the existence of a ridge only.

For such judgement, a ratio of power spectrum sums near the extreme points (approximately 3×3) may be used. That is, when the power spectrum sum around the highest maximum value is v1 and the power spectrum sum around the second highest maximum value is v2, if the value of v2/v1 is more than a predetermined threshold, the region is judged as a crease and ridge mixed region, and otherwise, the region is judged as a region including the existence of a ridge only. The power spectrum of a local region may be calculated by the region feature judging part 17, or the power spectrum calculated by the local information extracting part 12 may be used. As mentioned in Japanese Unexamined Patent Publication No. Hei-9-167230, when using the local information extracting part, ridge candidate image attribute information may be used.

Next, the suitable ridge candidate selecting part 18 selects candidates among the ridge candidate images of each of all detected adjacent regions based on the results of judgements by the region feature judging part 17 (S208). Concretely, in regions judged as including a mixture of creases and ridges, selection is carried out by regarding continuity with surrounding ridge candidates as important, and in regions judged as including ridges only, selection is carried out by taking continuity with surrounding ridge candidates and energy sums of the ridge candidate images as evaluation criteria.

For example, as mentioned in Japanese Unexamined Patent Publication No. Hei-9-167230, when it is judged that creases and ridges are mixed, a ridge candidate image in which the direction difference J1(n) between the mean direction in the proximity and the direction of the n-th ridge candidate image becomes minimum is selected as a ridge. In a case where the region is judged as a region including the existence of a ridge only, a ridge candidate image in which the direction difference J2(n) between the mean direction in the proximity and the direction of the n-th ridge candidate image+α/SN(n) becomes minimum is selected as a ridge.

Herein, α is a constant, and SN(n) is shown by following Formula (10).

$$SN(n) = \frac{va_n^{(i,j)}}{\sum_{i=j}^{6} va_i^{(i,j)}} \qquad (10)$$

The suitable ridge candidate selecting part 18 thus executes candidate selection processing for each of all adjacent regions, and notifies the adjacent region group detecting part 14 and image generating part 16 of the selected ridge candidates.

Next, the process returns to S205 again, and with respect to highly reliable regions or local regions selection for which the process has ended, all adjacent regions that are neither highly reliable regions nor regions selection for which the process has ended are detected. That is, taking FIG. 3A as an example, all regions adjacent to the lower sides of previously found adjacent regions are found. Next, in S206, it is judged whether or not the number of adjacent regions is one or more, and when the number is one or more, the region feature is judged for each of all adjacent regions in S207, and in S208, based on the results of the region feature judgement, candidate selection processing is executed by using different criteria adapted to each of all adjacent regions. Hereinafter, the processing from S205 through S208 is repeated in the same manner, and if "NO" is judged in S206, the image generating part 16 generates a whole fingerprint/palmprint ridge image based on the ridge candidates that have been selected by the suitable ridge candidate image selecting part 18, ridge candidates that have been judged as being highly likely to show ridges by the highly reliable region determining part 13, and local information obtained by the local information extracting part 12 (S209), and then all processing ends.

Herein, in the conventional ridge candidate selecting method disclosed in Japanese Unexamined Patent Publication No. Hei-9-167230, energy of a ridge candidate image derived from a crease sometimes becomes greater than that derived from a ridge in a region including a mixture of creases and ridges, so that a crease is erroneously selected when using the energy of a ridge candidate image as selection criteria. On the other hand, even in regions including ridges only, when selection is made based on only continuity with ridge candidate images in adjacent local regions at a portion such as a core or delta with a high ridge curvature, if noise components having greater excellent continuity than that of true ridges exist, such noise components are selected and ridge extraction is failed. Since ridge candidate image energy derived from such noise components is smaller than energy derived from ridges, it is possible to make judgement as to whether it is noise or ridges by using the magnitudes of energy. That is, although energy having no relation to curvatures can be used for ridge selection in a case where no creases exist, such selection is not possible in a case where creases are mixed.

Figure 7:
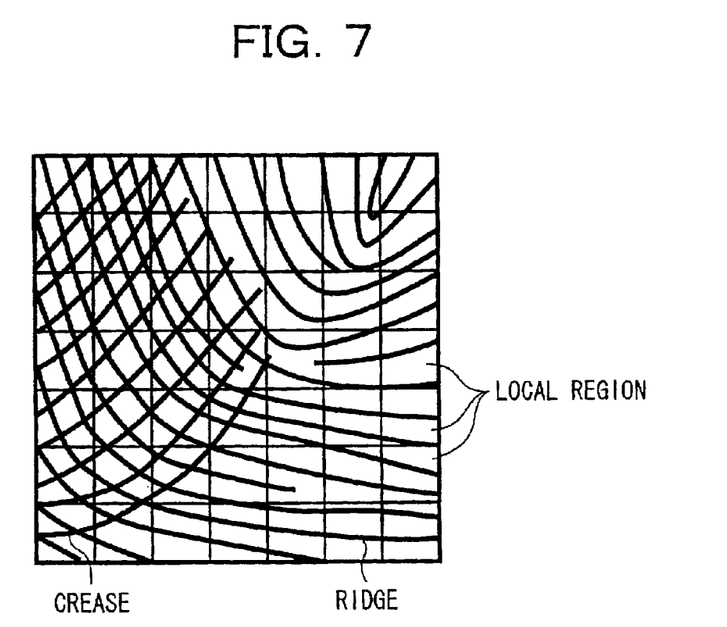
FIG. 7 is a drawing showing an example of a fingerprint/palmprint image having regions including a mixture of creases and ridges and regions including the existence of ridges only.
Figure 8:
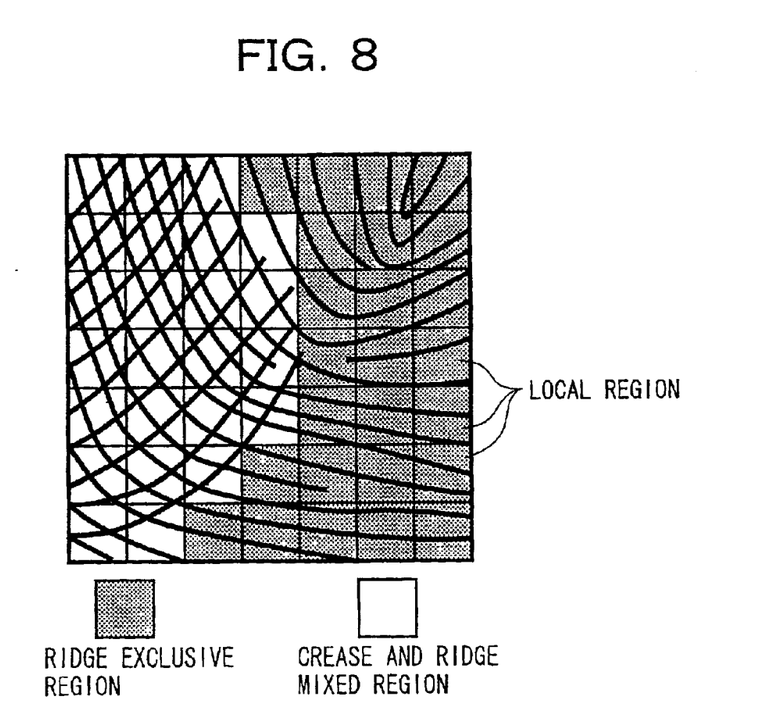
FIG. 8 is a drawing showing the results of judgement of the fingerprint/palmprint image of FIG. 7 by a region feature judging part 17 of FIG. 5.

Therefore, in the present embodiment, the region feature judging part 17 judges whether regions are crease and ridge mixed regions or regions including the existence of ridges only, and the suitable ridge candidate selecting part 18 selects image candidates based on evaluation criteria suitable for each region, so that even at a portion such as a core or delta including neat ridges with high curvatures without creases, the ridges can be accurately extracted while maintaining ridge extraction performance for crease and ridge mixed regions. FIG. 7 shows an example of a fingerprint/palmprint image having regions including a mixture of creases and ridges and regions including ridges only. The results of judgement by the region feature judging part 17 from such an image are shown in FIG. 8. The suitable ridge candidate selecting part 18 selects ridge candidates based on evaluation criteria that are different between the ridge exclusive regions and crease and ridge mixed regions of FIG. 8.

Figure 9:
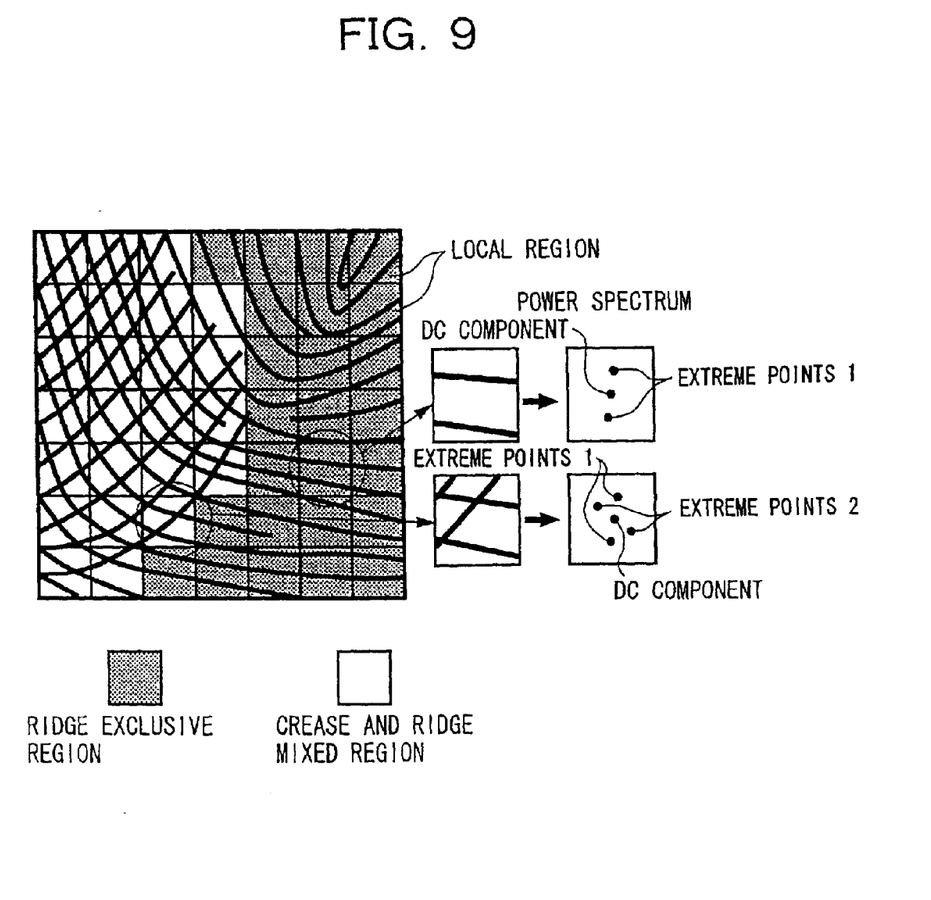
FIG. 9 is a drawing for explaining power of local images.

In a region including a ridge only without creases, when Fourier transform is applied to the small region image of the region, a pair of peaks are found to be symmetrical with respect to the origin, and a great amount of energy is concentrated on the peaks. However, in a Fourier transformed image of a region simultaneously including the existence of creases and ridges, a plurality of peaks derived from the creases and derived from the ridges appear and each peak has a great amount of energy (see FIG. 9). Therefore, when a plurality of peaks are detected from a small region Fourier transformed image by using the method disclosed in Japanese Unexamined Patent Publication No. Hei-9-167230, in regions including ridges only, most energy is concentrated on an energy maximum peak, and the energy difference from the second maximum peak energy becomes great. On the other hand, regions including a mixture of creases and ridges, the energy difference between the energy maximum peak and the second maximum peak becomes small. Therefore, in the present embodiment, by evaluating the scale of such a ratio, it can be judged whether or not the regions are regions including a mixture of creases and ridges.

Furthermore, in the conventional ridge candidate selecting method disclosed in the above-mentioned publication, as aforementioned, energy of a ridge candidate image derived from creases may be greater than energy derived from ridges in a region including a mixture of creases and ridges, so that the creases may be erroneously selected if the energy of the ridge candidate image is used as evaluation criteria. On the other hand, with respect to a region including only ridges with high curvatures, selection is made for adjacent local regions based on only continuity with ridge candidate images, in a case where noise components with more excellent continuity than true ridges exist, the noise components are selected and the ridge extraction is failed. Energy of a ridge candidate image derived from such a noise component is smaller than energy derived from a ridge, so that judgement is possible based on the amount of energy.

Therefore, in the present embodiment, the suitable ridge candidate selecting part 18 selects image candidates in crease mixed regions by using only direction continuity without using energy as selection criteria. Furthermore, candidate selection is made in regions including the existence of ridges only by regarding energy as important. Thereby, while maintaining ridge extraction performance for crease and ridge mixed regions, ridges can be accurately extracted from even a portion such as a core or delta including neat ridges with high curvatures without creases.

A computer program according to the invention is a program describing processes for execution of the above-mentioned method for processing a fingerprint/palmprint image. That is, the program causes a computer to carry out the processes for dividing a fingerprint/palmprint image into local regions and extracting ridge candidate images showing ridges from each local region; determining candidate images that are highly likely to be ridges among the extracted ridge candidate images and local regions including the determined ridge candidates as highly reliable regions; judging whether local regions other than the highly reliable regions are ridge exclusive regions including the existence of ridges only or crease and ridge mixed regions including a mixture of creases and ridges; selecting candidate images that are supposed to show ridges among the ridge candidate images based on evaluation criteria adapted to each ridge exclusive region and crease and ridge mixed region; and generating a whole image based on the candidate images of the highly reliable region determining process and the candidate images selected in the selecting process.

As described above, according to the invention, judgements are made as to whether regions including a mixture of creases and ridges or regions exclusively including ridges, and candidate images are selected among ridge candidate images by changing evaluation criteria between these two regions when extracting ridges, so that ridges can be accurately extracted from even crease mixed regions or regions including ridges with high curvatures.

What is claimed is:

1. A fingerprint/palmprint image processor comprising:
   a reading-in part for reading-in a fingerprint or palmprint as an image;
   an extracting part for dividing a fingerprint/palmprint image into local regions and extracting ridge candidate images showing ridges for each local region;
   a determining part for determining candidate images that are highly likely to be ridges among the extracted ridge candidate images and local regions including the determined candidate images as highly reliable regions;
   a judging part for judging whether or not local regions other than the highly reliable regions are ridge exclusive regions including the existence of ridges only or crease and ridge mixed regions including a mixture of creases and ridges;
   a selecting part for selecting candidate images that are supposed to show ridges among ridge candidate images based on different evaluation criteria adapted to each of the ridge exclusive regions and crease and ridge mixed regions; and
   a generating part for generating a whole image based on the candidate images of the highly reliable region determined from the determining part and the candidate images selected by the selecting part.

2. The fingerprint/palmprint image processor according to claim 1, wherein the judging part judges whether or not local regions are regions including the existence of ridges only or regions including a mixture of creases and ridges based on power spectrum ratios at a plurality of extreme points of a local image power spectrum.

3. The fingerprint/palmprint image processor according to claim 1, wherein the judging part judges whether or not local regions are regions including the existence of ridges only or crease and ridge mixed regions based on a ratio of the square roots of a power spectrum at a plurality of extreme points of a power spectrum of local images.

4. The fingerprint/palmprint image processor according to claim 1, wherein the judging part judges whether or not local regions are regions including ridges only or regions including a mixture of creases and ridges based on ratios of sums of power spectrum components in the proximity of a plurality of extreme points of a power spectrum of local images.

5. The fingerprint/palmprint image processor according to claim 2, wherein the judging part uses extreme points except for direct current components in the power spectrum.

6. The fingerprint/palmprint image processor according to claim 3, wherein the judging part uses extreme points except for direct current components in the power spectrum.

7. The fingerprint/palmprint image processor according to claim 4, wherein the judging part uses extreme points except for direct current components in the power spectrum.

8. The fingerprint/palmprint image processor according to claim 2, wherein among power spectrum extreme points, a first maximum extreme point and a second maximum extreme point within a range in which frequencies are effective as ridges are used for evaluation.

9. The fingerprint/palmprint image processor according to claim 3, wherein among power spectrum extreme points, a first maximum extreme point and a second maximum extreme point within a range in which frequencies are effective as ridges are used for evaluation.

10. The fingerprint/palmprint image processor according to claim 4, wherein among power spectrum extreme points, a first maximum extreme point and a second maximum extreme point within a range in which frequencies are effective as ridges are used for evaluation.

11. The fingerprint/palmprint image processor according to claim 1, wherein the selecting part uses continuity with surrounding ridge candidates as criteria for selection in regions including a mixture of creases and ridges, and employs continuity and sum amount of energy of ridge candidate images as criteria for selection in regions including ridges only.

12. A fingerprint/palmprint image processing method comprising the steps of:
    reading-in a fingerprint or palmprint as an image;
    dividing the fingerprint/palmprint image into local regions and extracting ridge candidate images showing ridges for each local region;
    determining candidate images that are highly likely to be ridges among the extracted ridge candidate images and local regions including the determined candidate images as highly reliable regions;
    judging whether local regions other than the highly reliable regions are ridge exclusive regions including ridges only or crease and ridge mixed regions including a mixture of creases and ridges;
    selecting candidate images that are supposed to show ridges among the ridge candidate images based on different evaluation criteria adapted to each of the ridge exclusive regions and crease and ridge mixed regions; and
    generating a whole image based on candidate images of the highly reliable region determined in the determining step and candidate images selected in the selecting step.

13. The fingerprint/palmprint image processing method according to claim 12, wherein the judging step judges whether or not local regions are regions including the existence of ridges only or regions including a mixture of creases and ridges based on power spectrum ratios at a plurality of extreme points of a local image power spectrum.

14. The fingerprint/palmprint image processing method according to claim 12, wherein the judging step judges whether or not local regions are regions including the existence of ridges only or crease and ridge mixed regions based on a ratio of the square roots of a power spectrum at a plurality of extreme points of a power spectrum of local images.

15. The fingerprint/palmprint image processing method according to claim 12, wherein the judging step judges whether or not local regions are regions including ridges only or regions including a mixture of creases and ridges based on ratios of sums of power spectrum components in the proximity of a plurality of extreme points of a power spectrum of local images.

16. The fingerprint/palmprint image processing method according to claim 13, wherein extreme points except for direct current components in the power spectrum are used.

17. The fingerprint/palmprint image processing method according to claim 14, wherein extreme points except for direct current components in the power spectrum are used.

18. The fingerprint/palmprint image processing method according to claim 15, wherein extreme points except for direct current components in the power spectrum are used.

19. The fingerprint/palmprint image processing method according to claim 13, wherein among power spectrum extreme points, a first maximum extreme point and a second maximum extreme point within a range in which frequencies are effective as ridges are used for evaluation.

20. The fingerprint/palmprint image processing method according to claim 14, wherein among power spectrum extreme points, a first maximum extreme point and a second maximum extreme point within a range in which frequencies are effective as ridges are used for evaluation.

21. The fingerprint/palmprint image processing method according to claim 15, wherein among power spectrum extreme points, a first maximum extreme point and a second maximum extreme point within a range in which frequencies are effective as ridges are used for evaluation.

22. The fingerprint/palmprint image processing method according to claim 12, wherein the selecting step uses continuity with surrounding ridge candidates as criteria for selection in regions including a mixture of creases and ridges, and employs continuity and sum amount of energy of ridge candidate images as criteria for selection in regions including ridges only.

23. A program for causing a computer to carry out the processes for:
    dividing a fingerprint/palmprint image into local regions and extracting ridge candidate images showing ridges for each local region;
    determining candidate images that are highly likely to be ridges among the extracted ridge candidate images and local regions including the determined candidate images as highly reliable regions;

judging whether or not local regions other than the highly reliable regions are ridge exclusive regions including the existence of regions only or crease and ridge mixed regions including a mixture of creases and ridges;

selecting candidate images that are supposed to show ridges among the ridge candidate images based on different evaluation criteria adapted to each of the ridge exclusive regions and crease and ridge mixed regions; and generating a whole image based on candidate images of the highly reliable region determined in the determining process and candidate images selected in the selecting process.

24. The program according to claim 23, wherein the judging process judges whether or not local regions are regions including the existence of ridges only or regions including a mixture of creases and ridges based on power spectrum ratios at a plurality of extreme points of a local image power spectrum.

25. The program according to claim 23, wherein the judging process judges whether or not local regions are regions including the existence of ridges only or crease and ridge mixed regions based on a ratio of square roots of a power spectrum at a plurality of extreme points of a power spectrum of local images.

26. The program according to claim 23, wherein the judging process judges whether or not local regions are regions including ridges only or regions including a mixture of creases and ridges based on ratios of sums of power spectrum components in the proximity of a plurality of extreme points of a power spectrum of local images.

27. The program according to claim 24, wherein the judging process uses extreme points except for direct current components in the power spectrum.

28. The program according to claim 25, wherein the judging process uses extreme points except for direct current components in the power spectrum.

29. The program according to claim 26, wherein the judging process uses extreme points except for direct current components in the power spectrum.

30. The program according to claim 24, wherein among power spectrum extreme points, the first maximum extreme point and the second maximum extreme point within a range in which frequencies are effective as ridges are used for evaluation.

31. The program according to claim 25, wherein among power spectrum extreme points, a first maximum extreme point and a second maximum extreme point within a range in which frequencies are effective as ridges are used for evaluation.

32. The program according to claim 26, wherein among power spectrum extreme points, a first maximum extreme point and a second maximum extreme point within a range in which frequencies are effective as ridges are used for evaluation.

33. The program according to claim 23, wherein the selecting process uses continuity with surrounding ridge candidates as criteria for selection in regions including a mixture of creases and ridges, and employs continuity and sum amount of energy of ridge candidate images as criteria for selection in regions including ridges only.

* * * * *